June 14, 1960  B. B. WINTER  2,940,639
TUBULAR FEEDING DEVICE
Filed Nov. 19, 1956  3 Sheets-Sheet 1

INVENTOR.
BILLY BERT WINTER
BY
ATTORNEY

June 14, 1960
B. B. WINTER
2,940,639
TUBULAR FEEDING DEVICE
Filed Nov. 19, 1956
3 Sheets-Sheet 2
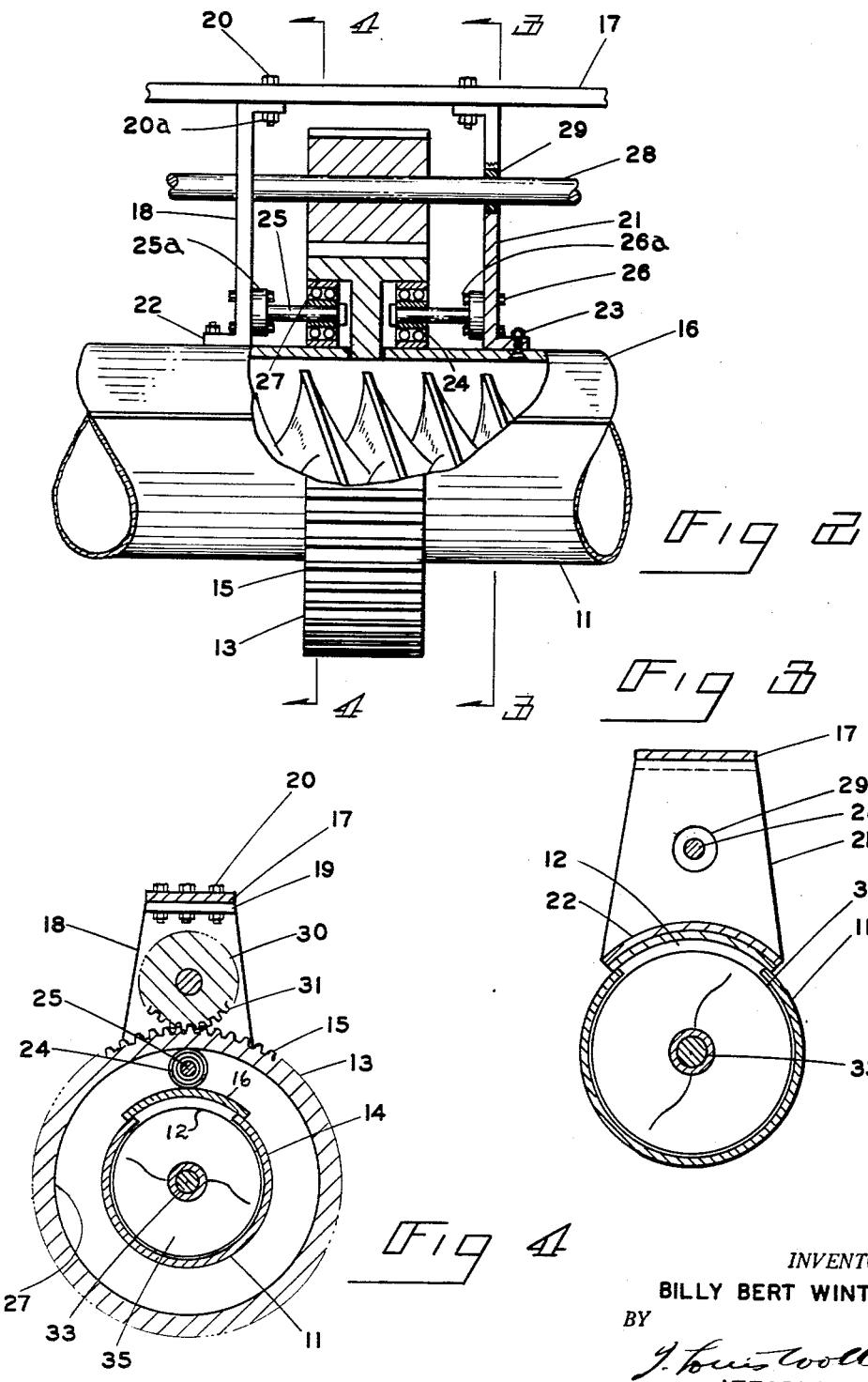
INVENTOR.
BILLY BERT WINTER
BY
ATTORNEY June 14, 1960  B. B. WINTER  2,940,639
TUBULAR FEEDING DEVICE
Filed Nov. 19, 1956  3 Sheets-Sheet 3
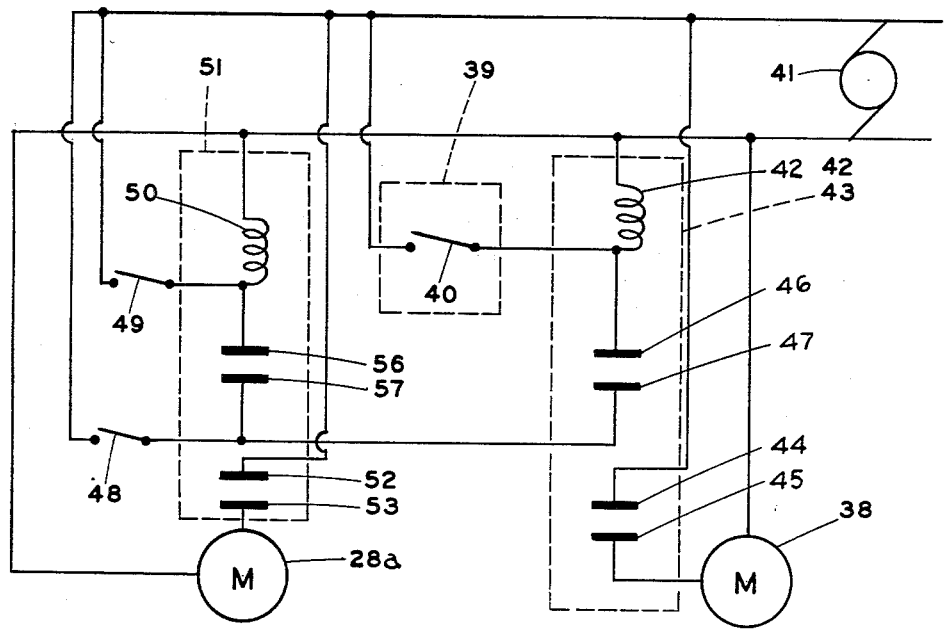
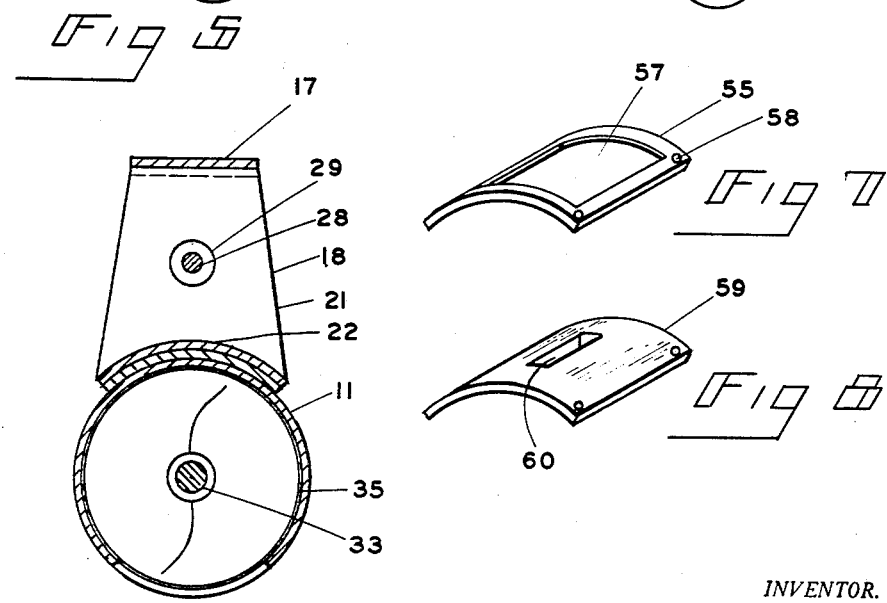
INVENTOR.
BILLY BERT WINTER
ATTORNEY United States Patent Office 2,940,639
Patented June 14, 1960

2,940,639

TUBULAR FEEDING DEVICE

Billy B. Winter, Towanda, Ill.

Filed Nov. 19, 1956, Ser. No. 623,113

18 Claims. (Cl. 222—60)

This invention relates to a device for automatically feeding livestock, such as hogs, sheep, rabbits, poultry, or the like. More specifically, it relates to a device which is used to supply feeds preferably of the nonfibrous type to said livestock at predetermined times and in predetermined quantities. In contrast to this device, my co-pending application Serial No. 622,891, entitled "Stock Feeding Device," and filed November 19, 1956, is designed to handle fibrous and fluffy feeds.

The tendency in this country toward larger farms with a larger number of livestock on each farm, coupled with the diminished amount of farm labor, has led to a serious feeding problem in recent years. The older methods of carrying feed by hand in small containers are no longer satisfactory, nor consistent with the modern mechanization which we now accept as normal on our farms. In addition, it is an agricultural fact that certain types of stock, especially cattle, become disturbed by the presence of people during feeding time and that they will eat much better—hence, gain more weight—if undisturbed. It is a further accepted fact that regular feedings two, three or four times daily will also tend to improve the eating capacity of the stock with resulting increase in the rate of gain of weight. A measured ration, fed several times a day, keeps the animals within a close percentage of their full feeding capacities and allows a more efficient gain in weight per unit of ration. Such a feeding procedure also makes for a better carcass dressing percentage toward leaner cuts.

It is a principal object of this invention to provide a livestock feeding apparatus which, when operated, delivers feed at various points along the length of the feeder simultaneously so that the feed is then available to every animal and the stock do not congregate at a limited number of feeding positions.

Another object is to provide an apparatus with which the daily ration of feed given to each animal may be increased or decreased by (1) increasing or decreasing the frequency of feeding, or (2) by changing the quantity of feed delivered each feeding.

More specifically, it is an object to provide a feed handling and distributing means particularly suited for operation automatically by timer controlled means.

Another more specific object is to provide a feeder having a feeding container which may be automatically filled and discharged so as to carry out fully automated feeding procedures.

A further object of the invention is to meter feed to said feeding container at predetermined times and in predetermined cycles.

An additional object is to provide for automatically stopping the flow of feed when the container is at desired capacity.

These and other objects are described in the following specification, claims, and drawings in which:

Figure 2 is a side view of a portion of the feeding device, partly in section, illustrating certain features of the mechanism.

Figure 3 is a sectional view of the mechanism taken along the lines 3—3 of Figure 2.

Figure 4 is a sectional view taken along the lines 4—4 of Figure 2.

Figure 5 is a wiring circuit of the device covered by the invention.

Figure 6 is a sectional view of the mechanism, similar to Figure 3, illustrating the maximum feed emptying position.

Figure 7 is a perspective view of the orifice plate shown in Figure 1.

Figure 8 is a perspective view of an orifice plate similar to the one in Figure 7 but of different size.

Figure 1:
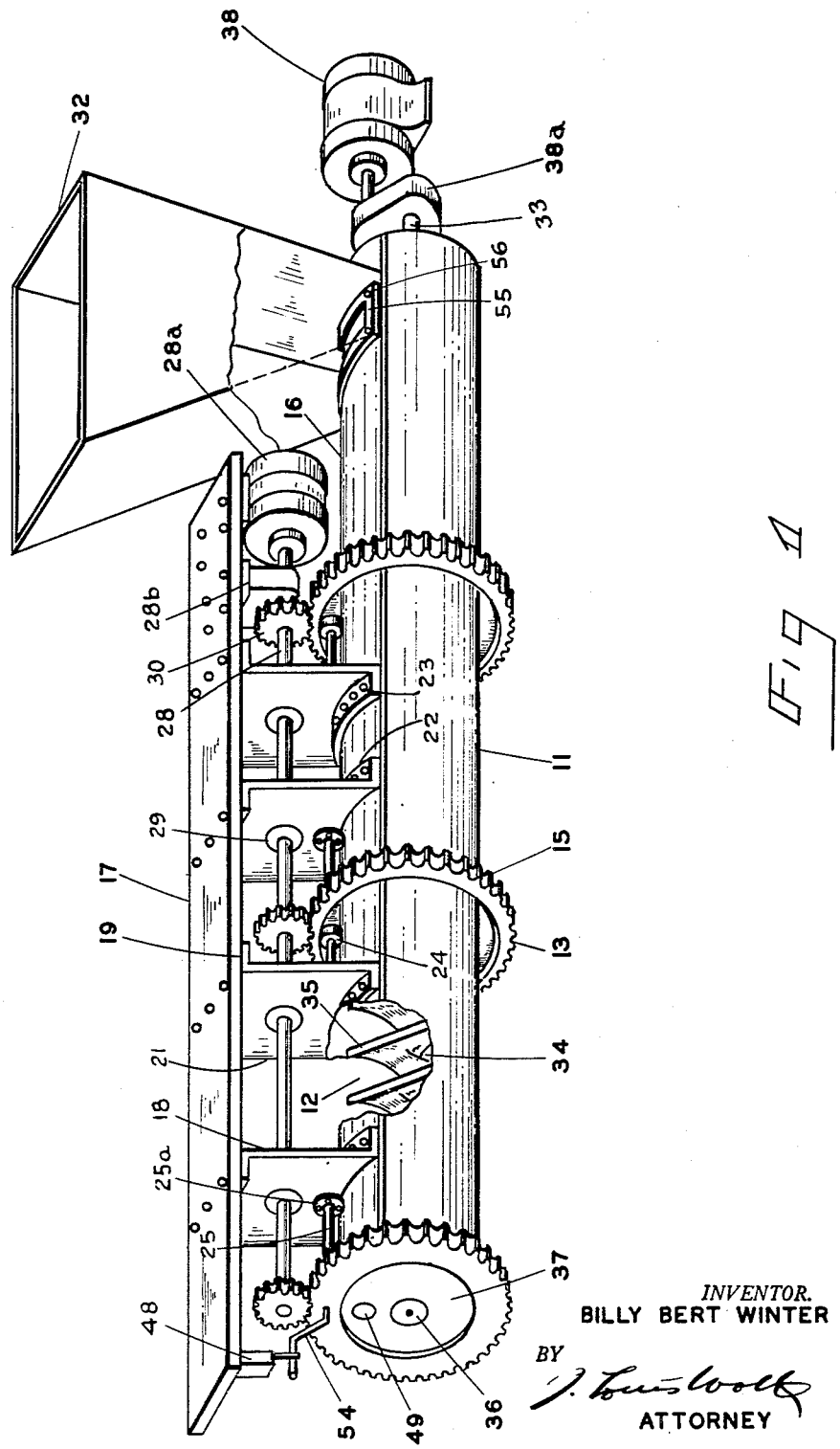
Figure 1 is a perspective view of the feeding device of my invention.

Referring to the drawings, for purposes of illustration the invention is shown embodied in a feeding apparatus which includes, in general, a rotatable tube (mounted over a feed bunker) to which feed is metered from a supply hopper at one end. An auger, within the tube, carries the feed from the hopper along the tube. According to this invention, by rotating the tube, the feed therein is discharged simultaneously at all points along its length and into the feed bunker so that the stock can feed anywhere along the feed bunker. As will appear in more detail hereinafter, the feeding apparatus may be timer operated and a metering device or means may be used to meter the amount of feed admitted to the tube each feeding cycle. Thus the size of the ration may be increased or decreased by the amount of fill and the number of times the feeding zone is filled or placed in cycle per feeding. Operated in this manner, the feeding device described herein is particularly adapted to the feeding of concentrated non-fibrous feeds to animals.

Turning in more specific detail to the apparatus shown in the drawings, as best shown in Figure 1, the feeding device consists primarily of a feed carrying tube 11 which may be made of any suitable material such as metal or plastic. The tube is circular in cross section except for the top portion which forms an opening 12 comprising approximately one-third to one-eighth of the circumference. The length and cross section of the tube may be varied depending on the amount of feed that it is desired to handle. Naturally, the capacity of the tube depends on varying these dimensions, and other critical factors, such as the length of the said bunker, are also important to the determination of these dimensions. At intervals along the length of the tube are fastened a plurality of driven gears 13 which have central apertures 14 large enough to permit tube 11 to be passed therethrough. The gear also includes conventional gear teeth 15 of any desired design, pitch, and number in accordance with the usual mechanical requisites of force and speed. Each gear is permanently fastened to the tube by means of welding, riveting, staking, brazing, or other methods known in the art. The upper portion of the tube 12, which is open, is enclosed by means of a cap 16 which is arcuate in cross section and conforms with the curvature of the tube. The cap extends between each adjacent pair of gears and is supported by structure to be described below.

It is usually desired to mount the feeding mechanism by overhead structure in order that the feed may be discharged into the feed bunker on the floor of the shed or barn. Furthermore, in keeping with the invention, the feed is discharged simultaneously along the length of the feeder, so that the stock, instead of congregating at a limited number of feeding positions, may feed at any point along the feed bunker.

For mounting the feeding mechanism, an overhead structural member 17 may be provided running parallel to the desired direction of the feeding tube. This member 17, for example, may be an ordinary wooden or metal structural member such as an I-beam or heavy wooden beam attached to the rafters or beams of a barn or shed. The tube may also be supported on and by the feed bunks or other low supports. A plurality of primary structural supporting members comprising the brackets 18 are attached to the member 17. These brackets include an upper flanged end 19 which is parallel to and in contact with the lower surface of the overhead member 17, and is fastened thereto by means of conventional fastening means such as a plurality of bolts 20 and nuts 20a. Extending downwardly from the flanged end 19 is the main bracket web 21 which is vertical and terminates in an arcuate lower flange 22 that is concentric with and contiguous with the upper surface of the cap 16. The cap is supported from the bracket by conventional means such as rivets 23 passing through the cap and the flange 22. These rivets are preferably of countersunk type in which the heads are formed on the inside of the cap in order to provide a smooth inner cap surface without protuberances. The brackets 18 also serve to support the gears 13. This support is provided by means of roller bearings 24 which are attached to each bracket by means of a central stub shaft 25 having a flanged end 25a which is adjacent to web 21 of the bracket. The flange is attached to the bracket by conventional fastening means, such as screws 26 and nuts 26a shown in Figure 2. Each gear 13 is undercut in the annular portion between the teeth and the central opening, thus forming a bearing surface 27 into which the bearing 24 is placed. The bearing thus supports the gear (hence the tube 11 welded thereto) in such a manner that the gear and tube may be rotated for reasons to be later described.

In addition to the functions previously described, the brackets 18 also provide a support for a drive shaft 28. This is accomplished by means of bearings 29 also mounted in the web 21 of the bracket in which the shaft 28 is rotatably mounted. A plurality of driving gears 30 are permanently fastened to the drive shaft 28 and include gear teeth 31 which are equivalent in pitch and depth to the gear teeth 15 of the driven gears 14. These driving gears are so located on the drive shaft that they are enmeshed with the driven gears for reasons to be presently described.

At one end of the tube 11, a portion of the cap 16 has been removed to provide an opening into the upper end of the tube. As can best be seen in Figure 1, a metering device or orifice plate 55 is mounted on the cap by means of removable fasteners such as screws 56 or other conventional devices. The orifice plate simply consists of a thin sheet of metal, plastic, or other suitable material, curved to fit the shape of the cap, and having its center cut out to form an aperture 57 of desired size. At the corners are provided holes 58 through which the screws 56 may pass. The size of the aperture 57, therefore, will govern the amount of feed that is permitted to pass into the tube. The orifice plate 55 is shown in more detail in Figure 7.

When it is desired to allow a different quantity of feed to be metered into the tube, a different orifice plate, such as the one designated by numeral 59 in Figure 8, may be substituted by simply removing the screws 56, lifting off orifice plate 55, and installing orifice plate 59. The aperture 60 of this latter plate is of a different size than aperture 57, and thus meters a different quantity of feed.

It should be understood that the specific method of controlling the flow of feed or means for metering the latter, which is described herein is merely exemplary, and that the invention does not depend upon the use of these orifice plates.

In order to pass feed through the orifice plate and into the tube, a hopper 32 is mounted directly over the plate and supported by some convenient portion of the overhead structure. This hopper is of conventional design and one that will have a sufficient capacity for one or more feedings. A driving motor 28a is coupled to the drive shaft 28 through a speed reduction device 28b, such as a gearbox of the type well known in the art. The device is designed to provide a sufficiently low driving speed for proper operation. The motor and device are mounted on some convenient portion of the structure, for example the overhead member 27. In order to drive the feed into the container or tube 11 an auger shaft 33 is passed completely through the center of the tube, and mounted on the shaft is an auger 34 of conventional design. As is well known in the art, this auger comprises a continuous helical surface 35 providing a succession of ridges and valleys. The auger shaft is mounted at each end of the tube by means of bearings 36 which are mounted in end plates 37 which close off the ends of the tube 11. An auger driving motor 38 is mounted at the end of the tube or from some convenient structure, and is coupled to the auger drive shaft by a speed reduction device 38a to operate at fairly slow speeds. The reduction device is similar to device 28b previously described, and is mounted to the same structure.

Operation

As is best shown in Figure 5, the mechanism just described is controlled and actuated by conventional electrical components. The basic controlling device is a timer 39 of conventional design which may be preset at the times at which it is desired to feed the stock. It may be set, for example, at 6:00 A.M., 10:00 A.M., 2:00 P.M., and 6:00 P.M., or at any other hours and frequencies found desirable according to the type and age of stock, the season of the year, or other factors. When the preselected time is reached, the timer will cause the switch 40 to close and allow current to pass from the source of power 41 through the energizing coil 42 of the auger motor relay 43, and back to the source 41 completing the circuit and closing the contacts 44 and 45 of the relay. This completes the circuit to the auger motor 38 which rotates the shaft 33 thus rotating the auger 34. The feed which has been previously placed in the hopper 32 passes through the metering device 55 and then will be picked up by the auger and carried into the tube 11. Since the tube opening 12 is closed off by the cap 16 and the end pieces 37, the tube will be filled to predetermined capacity with feed after a brief period of operation. At the same time, the energizing of coil 42 will also close the holding contacts 46 and 47 to allow the current to flow through a normally closed shutoff switch 48, thus permitting the relay 43 to remain closed after the initial pulse of current.

When the tube 11 is filled with feed, in accordance with this invention, the feed is automatically discharged into the feed bunker below the tube.

As disclosed herein, a pressure switch 49 mounted at the end 37 of the tube, is responsive to pressure of the feed so as to be actuated when a predetermined quantity of feed is metered into the tube. Closing the switch 49 allows current to pass through the switch 49 and the coils 50 of the driving gear motor relay 51 thus energizing this relay. This causes the contacts 52 and 53 to close and permit energization of the driving gear motor 28a. At the same time, holding contacts 56 and 57 are closed to permit operation of the relay to continue after the initial pulse. The motor is thereby actuated and rotates the shaft 28 and the gears 30 which in turn rotate the gears 13. The rotation is fairly slow in order to permit the feed contained within the tube to be completely removed and, therefore, simultaneously dumped from the tubular member 11 at all points of discharge along its length. The gear 13 in rotating also rotates the tube past the cap 16 which remains stationary, thus permitting the feed to fall out of the opening in the tube as it tends to reach its lowermost position as illustrated in Figure 6. Inasmuch as the speed is slow and the opening is fairly large, there is ample time for all of the feed to be deposited from the tube and into the feed bunkers below (not shown). The rotation of the driving motor 28a, shaft 28, driving gear 30, driven gear 13, and tube 11 will continue for a full 360 degree revolution in order to return the tube to its original position. At this point a finger 54 mounted on one of the gears 13 will strike a shutoff switch 48 thus breaking the circuits leading to the relay 51 and the relay 43 and shutting off both motors. This stops the rotation of the auger and the driving shaft, at which time the mechanism is in position for refilling during the next cycle. The switch 48 has been opened by the action of the finger 54 as previously described, but immediately thereafter the action of a spring within the switch forces the contacts shut again in order to make the circuit operative again at the next cycle. As many complete cycles as desired may be provided for in advance.

Thus it may be seen that by means of this invention a novel and simple mechanism is provided whereby feed is made available for livestock at predetermined times and in predetermined quantities. The invention consists essentially of a hollow tube carrying an auger which drives the feed into the tube and a mechanism for rotating the tube to discharge the feed into a container.

Further modifications and variations of this invention are contemplated without departure from the spirit of the invention. For example, the feed tubes may be grouped in tandem or end to end arrangement if it is desired to service a plurality of feed bunks by coupling shafts together to permit such a system. A single tube may feed a plurality of bunkers, or each bunker may have its own feeding device.

Variations in the electrical and mechanical devices illustrated are especially contemplated and the details shown are in no way intended to limit invention. For example, it is also possible to achieve the desired results by reversing the mechanical relationship illustrated. In other words, the main stationary part of the tube may be the upper instead of the lower portion, and the rotating part may be the lower portion. By means of such a structure the lower portion may be rotated to uncover the open part of the main tube, which is on the lower surface, to allow the feed to be removed.

I claim:

1. In an automatic livestock feeding device including a rotatable cylindrical feed container, a shutoff switch in said container capable of actuation by filling of said container, and a pre-set timing mechanism; a conveying mechanism comprising a motor-driven auger located partially within said container; said motor actuated by said timing mechanism to convey feed into said container, said shutoff switch initiating rotation of said container to cause removal of said feed therefrom and subsequently stopping rotation of said container and said auger.

2. An automatic device for feeding livestock comprising a tubular feed container having an opening at its upper surface, a cover for normally sealing said opening, conveying means partially located within said container and independently actuated to convey feed into said container, a pressure switch located in said container actuated by said feed when said container is full, and a device actuated by said pressure switch to cause a change in the relative circumferential positions of the cover and opening, said device subsequently restoring the original relationships of the cover and opening.

3. An automatic device for feeding livestock comprising a tubular feed container having an opening at its upper surface, a cover for normally sealing said opening, conveying means partially located within said container and independently actuated to convey feed into said container, a pressure switch located in said container actuated by said feed when said container is full, a device actuated by said pressure switch to cause a change in the relative circumferential positions of the cover and opening, said device subsequently restoring the original relationships of the cover and opening, and a shutoff switch actuated by said device to stop said device and conveying means.

4. An automatic device for feeding livestock comprising a rotatable container for said feed, a hopper mounted thereon, an independently actuated conveying mechanism partially contained within and conveying feed to said container, a pressure switch located in said container and actuated by said feed when said container is filled, a cover on the upper surface of said container maintaining a normally sealed relationship therewith, mechanism actuated by said pressure switch for rotating said container to permit discharge of feed therefrom, said mechanism continuing the rotation of said container to its original position, a shutoff switch located adjacent said container and actuated by said rotating mechanism to stop the conveying and rotating mechanisms.

5. The device of claim 4 in which said rotating mechanism includes at least one driving gear and at least one mating driven gear, said driven gear integral with said container.

6. An automatic device for feeding livestock comprising a rotatable cylindrical container having an opening at the top, an arcuate member normally sealing off said opening, a hopper mounted at one end of said container including an orifice plate for regulating the rate of flow of feed from said hopper to said end, a conveying mechanism comprising an independently actuated power-driven auger located partially within said container, to convey feed from said one end of the container toward the other end thereof, a plurality of driven gears integral with said container and a plurality of driving gears mounted on a power shaft and mating with said driven gears, a pressure switch located in said container and actuated by said feed when the container is filled to cause rotation of said driving gears and a corresponding rotation of said driven gears to rotate said container and permit discharge of said feed contained therein, a shutoff switch located adjacent one of said gears, said one gear contacting said shutoff switch at the completion of 360 degrees of its rotation to actuate said switch thus stopping the rotation of said gears and container and simultaneously stopping said conveying mechanism.

7. Apparatus for transporting and distributing particulate material which comprises an elongated substantially horizontal, axially rotatable trough member having an opening at the top, a receptacle positioned beneath said trough member in longitudinal alignment therewith and with said opening, conveyor means extending longitudinally within said trough member for introducing particulate material longitudinally of said trough member while its opening is in its upper position, means for supplying material to said conveyor means, means for rotating said trough member about its longitudinal axis to bring said opening into discharge position with respect to said receptacle after said particulate material has been introduced therein, said means thereafter returning said trough member to its filling position with its opening in an upper position.

8. Apparatus according to claim 7 wherein a closure means is provided over said opening to prevent escape of particulate material during its introduction into said tubular member.

9. Apparatus according to claim 7 wherein the opening in said tubular member is an elongated slot which is positioned above at least one receptacle in alignment therewith.

10. Apparatus according to claim 9 wherein the conveying means comprising an elongated auger extending axially within said tubular member.

11. An automatic livestock feeding device which comprises an elongated horizontally positioned axially rotatable tubular feed member, a longitudinally extending discharge opening formed in the wall of the tubular member, conveyor means positioned within said tubular member for conveying a predetermined quantity of feed longitudinally of said member, a feed supply for said conveyor, said tubular member being positioned for filling with said discharge opening in an upper position during introduction of a predetermined quantity of feed therein, power driven means for rotating said tubular member around its longitudinal axis, and means for causing actuation of said rotating means to cause rotation of said tubular member about its longitudinal axis responsive to the introduction of said predetermined quantity of feed therein thereby causing the opening in said tubular member to be rotated to a lower discharge position, said means thereafter continuing said rotation and returning said tubular member to its filling position.

12. In an automatic livestock feeding device, a feed container comprising an elongated substantially horizontally extending trough member having an opening at the top extending longitudinally thereof, conveyor means positioned within said trough member for introducing feed therein for a desired portion of its length, means for supplying feed to said conveyor, means for rotating said trough member about its longitudinal axis, means responsive to the feed reaching the desired point therein to actuate said rotating means thereby positioning said opening in a lower feed discharging position, and means for thereafter continuing said rotation to position said trough member with said opening at the top for further introduction of feed therein.

13. A feeding device according to claim 12 wherein a stationary closure member is positioned adjacent to the trough member overlying said opening therein thereby normally closing said opening while it is in its upper position during introduction of feed.

14. An automatic livestock feeding device comprising a horizontally extending elongated trough member open at the top, conveyor means for introducing feed longitudinally of the trough, means for supplying feed to said conveyor, means for rotating said trough around its longitudinal axis, means for actuating said rotating means when the trough is filled to a predetermined extent thereby positioning said opening in a lower discharging position, said means also discontinuing the introduction of feed therein, means for returning said trough to its normal filling position with the opening at the top, and means to resume introduction of feed therein preparatory to another discharging cycle.

15. An automatic livestock feeding device including a substantially horizontally extending elongated axially rotatable trough with an opening at the top, motor driven means connected to said trough to axially rotate the latter, circuit control means responsive to introduction of feed into said trough to a predetermined extent, a pre-set timing mechanism, a conveying means comprising a motor driven auger extending within and longitudinally of said trough, said motor being actuated by said timing mechanism to operate said conveying means to convey feed into said trough, and means for supplying feed to said conveying means, said circuit control means actuating rotation of said trough to cause discharge of feed therefrom by rotation of its opening to a lower position and subsequently stopping rotation of said trough when said opening is at the top.

16. A livestock feeder comprising an elongated substantially horizontally extending axially rotatable tubular feed container, an elongated opening extending longitudinally of said container, an elongated rotatable auger extending longitudinally within said container, power means to rotate said auger, means for supplying feed to said auger while it is rotating and thereby conveying said feed longitudinally into said container while said container is positioned with said opening above its horizontal axis during the introduction of said feed, means for rotating said tubular container about its longitudinal axis, said means being responsive to a predetermined quantity of feed introduced longitudinally thereof to move said opening to a discharge position below the horizontal axis of said container to thereby cause discharge of said feed, said means continuing the rotation of said container after discharge of said feed to its filling position.

17. Apparatus for transporting and distributing particulate material which comprises an elongated substantially horizontal, axially rotatable tubular member having an opening at the top, a receptacle positioned beneath said tubular member in longitudinal alignment therewith and with said opening, conveyor means including an auger extending longitudinally within said tubular member for introducing particulate material longitudinally of said tubular member while its opening is in its upper position, means for metering a predetermined quantity of material into said tubular member while said opening is in said upper position and said auger is operating to convey the material along said tubular member, means for rotating said tubular member about its longitudinal axis to move said opening into a lower discharge position over said receptacle when said predetermined quantity of material has been received in said tubular member and introduced along the latter by said auger, said means thereafter returning said tubular member to its filling position with said opening in an upper position.

18. In an automatic livestock feeding device, the combination comprising, an elongated substantially horizontal axially rotatable tubular member having an opening in the wall thereof, said tubular member being positioned for filling with said opening at the top, a receptacle positioned beneath said tubular member in longitudinal alignment therewith and with said opening to receive feed discharged from said tubular member through said opening when the latter is moved to a lower discharge position, conveyor means including a power-driven auger extending longitudinally within said tubular member for introducing particulate material longitudinally of said tubular member while its opening is in its upper position, means for metering a predetermined quantity of feed into said tubular member while said opening is in said uppper position and said auger is operating to convey the feed along said tubular member, and means for rotating said tubular member about its longitudinal axis to move said opening into discharge position over said receptacle when said predetermined quantity of material has been received in said tubular member and introduced along the latter by said auger so that the feed carried along the tubular member by said auger is simultaneously dumped from the tubular member at all points of discharge along said tubular member, said last-named means thereafter returning said tubular member to its filling position with its opening in an upper position.

References Cited in the file of this patent
UNITED STATES PATENTS

| | | |
|---|---|---|
| 735,167 | Steinberg | Aug. 4, 1903 |
| 1,027,453 | Prinz | May 28, 1912 |
| 1,444,052 | Babcock | Feb. 6, 1923 |
| 2,529,457 | Nilsson | Nov. 7, 1950 |
| 2,534,442 | Harvey | Dec. 19, 1950 |
| 2,610,726 | Howard | Sept. 16, 1952 |
| 2,646,023 | Virgil | July 21, 1953 |
| 2,685,863 | Martin | Aug. 10, 1954 |
| 2,785,831 | Smolin | Mar. 19, 1957 |
| 2,793,615 | Kerkvliet | May 28, 1957 |

UNITED STATES PATENT OFFICE
CERTIFICATE OF CORRECTION

Patent No. 2,940,639                      June 14, 1960

Billy B. Winter

It is hereby certified that error appears in the printed specification of the above numbered patent requiring correction and that the said Letters Patent should read as corrected below.

Column 8, line 64, list of References Cited, under UNITED STATES PATENTS, for "1,027,453" read -- 1,027,432 --.

Signed and sealed this 13th day of December 1960.

(SEAL)

Attest:

KARL H. AXLINE                      ROBERT C. WATSON
Attesting Officer                   Commissioner of Patents